United States Patent [19]
Kaneko

[11] Patent Number: 5,457,583
[45] Date of Patent: Oct. 10, 1995

[54] DISC RECORDER FOR RECORDING INFORMATION

[75] Inventor: Keiichi Kaneko, Yokohama, Japan

[73] Assignee: Victor Company of Japan, Ltd., Yokohama, Japan

[21] Appl. No.: 233,229

[22] Filed: Apr. 26, 1994

Related U.S. Application Data

[63] Continuation of Ser. No. 916,731, Jul. 17, 1992, abandoned.

[30] Foreign Application Priority Data

Jul. 18, 1991 [JP] Japan ................. 2-203947

[51] Int. Cl.⁶ ............................................ G11B 15/12
[52] U.S. Cl. ............................... 360/63; 360/61; 360/75
[58] Field of Search ........................ 369/47, 48, 49, 369/54, 58, 59; 360/61, 62, 63, 64, 98.02, 22, 77.08, 75

[56] References Cited

U.S. PATENT DOCUMENTS

| | | | |
|---|---|---|---|
| 5,153,787 | 10/1992 | Sidman | 360/77.08 |
| 5,191,437 | 3/1993 | Kim | 360/22 |

FOREIGN PATENT DOCUMENTS

| | | |
|---|---|---|
| 56-74807 | 6/1981 | Japan . |
| 57-55507 | 4/1982 | Japan . |
| 61-123922 | 6/1986 | Japan . |
| 2-39226 | 2/1990 | Japan . |
| 2-144752 | 6/1990 | Japan . |
| 2-206061 | 8/1990 | Japan . |

*Primary Examiner*—Georgia Y. Epps
*Assistant Examiner*—Muhammad N. Edun
*Attorney, Agent, or Firm*—Michael N. Meller

[57] ABSTRACT

Disc recorder for recording information is comprised of a plurality of disc faces and correspondingly provided heads for recording information on the disc faces, the heads are connected to corresponding recording/reproducing circuits controlled by a control device, the disc faces, the heads and the recording/reproducing circuits constitute recording/reproducing channels. The disc recorder performs recording and/or reproducing operations by utilizing 2 or more of the recording/reproducing channels concurrently where an information unit to be processed in the recording/reproducing channels and recorded on every sector on the disc faces, is adopted to be a logical block unit having a control signal region and a data region. Further feature of the invention is that the control device has an output signal line connected to a host system.

1 Claim, 6 Drawing Sheets

DISC RECORDER FOR RECORDING INFORMATION

This application is a continuation of application Ser. No. 916,731, filed Jul. 17, 1992 now abandoned.

BACKGROUND OF THE INVENTION

1. Field of the Invention

The present invention relates to a disc recorder for recording information, which is provided with a plurality of recording/reproducing channels and is capable of performing recording/reproducing operations through two or more channels in parallel each other.

2. Description of the Related Art

Disc recorders for recording information such as magnetic disc recorders, optical disc recorders and the like are widely used in recent years.

Among these disc recorders for recording information, a disc recorder which is provided with a plurality of disc faces for recording information and recording/reproducing heads arranged to confront these disc faces, is well known.

FIG. 1 is a block diagram showing a first example of a conventional magnetic disc recorder, and FIG. 2 is an explanatory diagram for explaining a system for recording information in the recorder shown in FIG. 1. Further, FIG. 6 is an explanatory diagram for explaining a format for recording/reproducing information in the recorders shown in FIG. 1 and FIG. 5 which will described later.

As shown in FIG. 1, a magnetic disc recorder 11 of the first conventional example is composed of a spindle 3, a set of five magnetic discs 2-1 to 2-5 designated generally as 2, and a disc face (0) which is an upper face of the uppermost disc 2-1, is referred to as $2_0$, a disc face (1) which is a lower face thereof is referred to as $2_1$, a disc face (2) which is an upper face of the second disc 2-2 is referred to as $2_2$, and the number is increased in consecutive order thereafter, and a disc face (8) which is an upper face of the lowermost disc 2-5 is referred to as $2_8$ and a disc face (9) which is a lower face thereof is referred to as $2_9$ fixed coaxially to the spindle 3 at equal intervals, a spindle motor 4 for rotating the spindle 3, thus the discs 2 are rotated in a CAV (constant angular velocity) system, magnetic heads $5_0$ to $5_9$ respectively confront disc faces (0) to (9) i.e. $2_0$ to $2_9$, a total of 10 heads $5_0$ to $5_9$ is designated generally as 5, and those 10 heads are suspended by respective arms, respective proximal ends thereof are coupled together to move as a unitary component in the radial direction of the discs 2, the magnetic heads $5_0$ to $5_9$ are electrically and respectively connected to a head selecting circuit 19 which selects one of these heads $5_0$ to $5_8$ and cause the selected head to perform a recording/reproducing operation, a recording/reproducing circuit 16 for controlling the recording/reproducing operation of the selected head, a tracking servo circuit 7 connected to the head $5_9$ for positioning the magnetic heads 5 in the radial direction of the discs 2 by driving an actuator (not shown) based on a tracking servo signal obtained from the head $5_9$ which detects a tracking servo signal prerecorded on a servo track on the lowermost disc face $2_9$, the tracking servo circuit 7, the recording/reproducing circuit 16 and the head selecting circuit 19 are connected respectively to a control circuit 18 which controls operations of these connected circuits in response to instructions from a host system (not shown) or the like.

In a format for recording/reproducing of information on these disc faces $2_0$ to $2_8$, each track is constituted of 52 sectors from a sector (0) to a sector (51), and one logical block (hereinafter abbreviated as a block) which is an information unit recorded on or reproduced from one each sector, is constituted of a control signal region including address mark signals, synchronizing signals, a signal for error correction and the like and a data region where user data are recorded/reproduced as shown in FIG. 6. Since the capacity "S" of this control signal region is 87 bytes and the capacity "D" of the data region is 512 bytes, one block includes 599 bytes.

As shown in FIG. 2, in an information recording system according to this first example of conventional magnetic disc recorder 11, when the heads 5 are positioned on a track (n), the head $5_0$ records or reproduces an information in the blocks (0), (1) and (2) on or from the track (n) of the disc face (0) in the order of sectors (0), (1) and (2) respectively. After a block (51) is recorded or reproduced on or from the last sector (51), the head $5_1$ records/reproduces an information in the blocks (0), (1) and (2) on/from the track (n) of the disc face (1) in the order of sectors (0), (1) and (2) respectively.

Accordingly, the information is recorded/reproduced in series in the unit of blocks on the track of the designated disc face. This conventional system of recorder 11 has a drawback of slow recording/reproducing speed due to the series recording/reproducing operations by a single head selected from the magnetic heads $5_0$ to $5_8$.

On a second example of conventional magnetic disc recorder, such drawback is improved where recording/reproducing operations are performed with two or more heads operating in parallel. Next, this type of magnetic disc recorder will be described as the second example being compared with the first example of recorder 11.

FIG. 3 is a block diagram showing the second example of a conventional magnetic disc recorder, and FIG. 4 is an explanatory diagram for explaining an information recording system in the recorder shown in FIG. 3.

As shown in FIG. 3, a magnetic disc recorder 21 in a second example is composed of the above mentioned magnetic discs 2, the spindle 3, the spindle motor 4, the magnetic heads 5, recording/reproducing circuits $6_0$ to $6_8$ (a total of 9 circuits are referred to generally as 6), the tracking servo circuit 7, and a control circuit 28.

The heads $5_0$ to $5_8$ are connected respectively to the recording/reproducing circuits $6_0$ to $6_8$ which control recording/reproducing operations of these heads $5_0$ to $5_8$, and the tracking servo circuit 7, and the recording/reproducing circuits 6 are connected respectively to the control circuit 28 which controls operations of these connected circuits in response to instructions from a host system (not shown) or the like. Description of similar parts to those in the recorder 11 of the first conventional example will be omitted here.

In an information recording system in the magnetic disc recorder 21, as shown in FIG. 4, when the magnetic heads 5 are positioned on the track (n), the heads $5_0$ to $5_8$ record or reproduce in parallel operation the control signal regions of one block explained with reference to FIG. 6 on or from the disc faces (0) to (8) i.e. $2_0$ to $2_8$ respectively. Thereafter, the first byte (0) in the data region including 512 bytes is divided into a bit (0) to a bit (7) and is added with a parity bit (P) to form a 9-bit signal which is recorded or reproduced on or from the disc faces (0) to (8) simultaneously in parallel operation, subsequently, the byte (1) divided into a bit (0) to a bit (7), is added with a parity bit (P) and is recorded in parallel operation.

Recording/reproducing in this manner continues up to the byte (511) so as to complete the block (0), and similarly, the parallel operation (simultaneous recording or reproduction by the heads $5_0$ to $5_8$) progresses with the blocks (1) and (2). Namely, data of 9 bits including a parity bit (P) are recorded/reproduced in parallel operation on the designated respective tracks on the 9 faces of the discs 2. Thus, a capacity of respective data regions in this case becomes ⅛ ("D"/8=64 bytes) per disc face of the case of the first conventional example, and one block includes 151 bytes×9=1,359 bytes.

This makes the second example disc recorder deficient in formatting i.e. it requires to provide the control signal region on each of the disc faces where the one block is comprised of 9 disc faces, this means poor surface utilization.

Accordingly it is an object of the present invention to provide a disc recorder for recording information in which a recording/reproducing speed is high and a format efficiency is improved.

SUMMARY OF THE INVENTION

A disc recorder for recording information of the present invention achieves the above-mentioned object by such a structure that, the disc recorder is comprised of a plurality of disc faces and correspondingly provided heads for recording information on the disc faces, the disc faces, the heads and correspondingly provided recording/reproducing circuits controlled by a control device constitute recording/reproducing channels. The disc recorder performs recording and/or reproducing operations by utilizing 2 or more of the recording/reproducing channels concurrently where an information unit to be processed in the recording/reproducing channels and recorded on every sector on the disc faces, is adopted to be a logical block unit having a control signal region and a data region. Further, the control device may have an output signal line connected to a host system.

DETAILED DESCRIPTION OF THE PREFERRED EMBODIMENT

As an embodiment of a disc recorder for recording information of the present invention, a magnetic disc recorder will be explained while comparing with the first and the second conventional examples.

Figure 1:
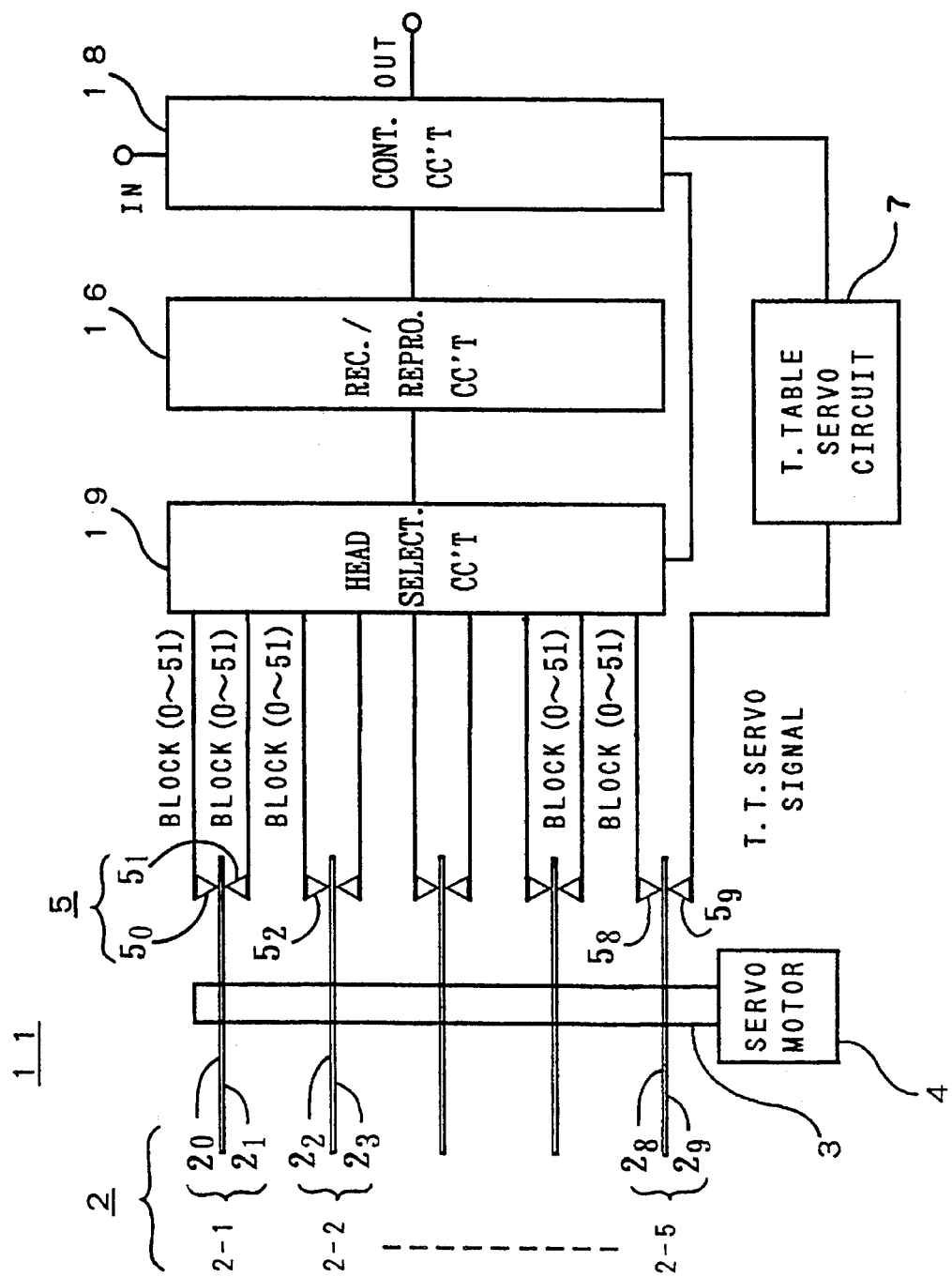
FIG. 1 is a block diagram showing the first example of a conventional magnetic disc recorder.
Figure 2:
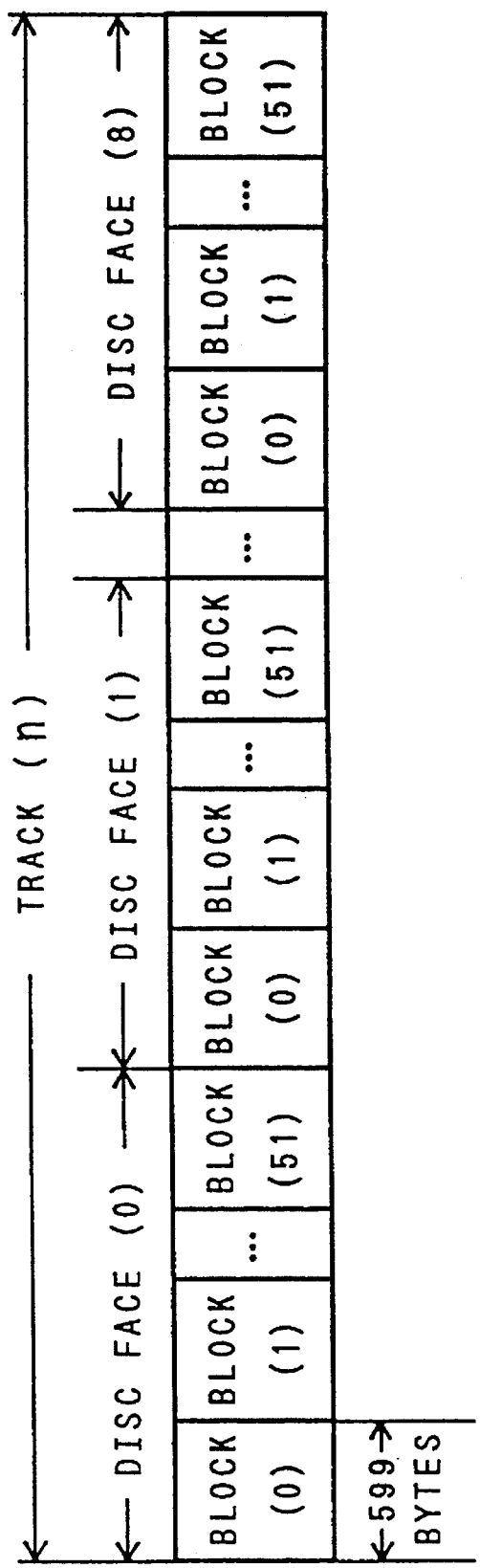
FIG. 2 is an explanatory diagram for explaining an information recording system in the recorder shown in FIG. 1.
Figure 3:
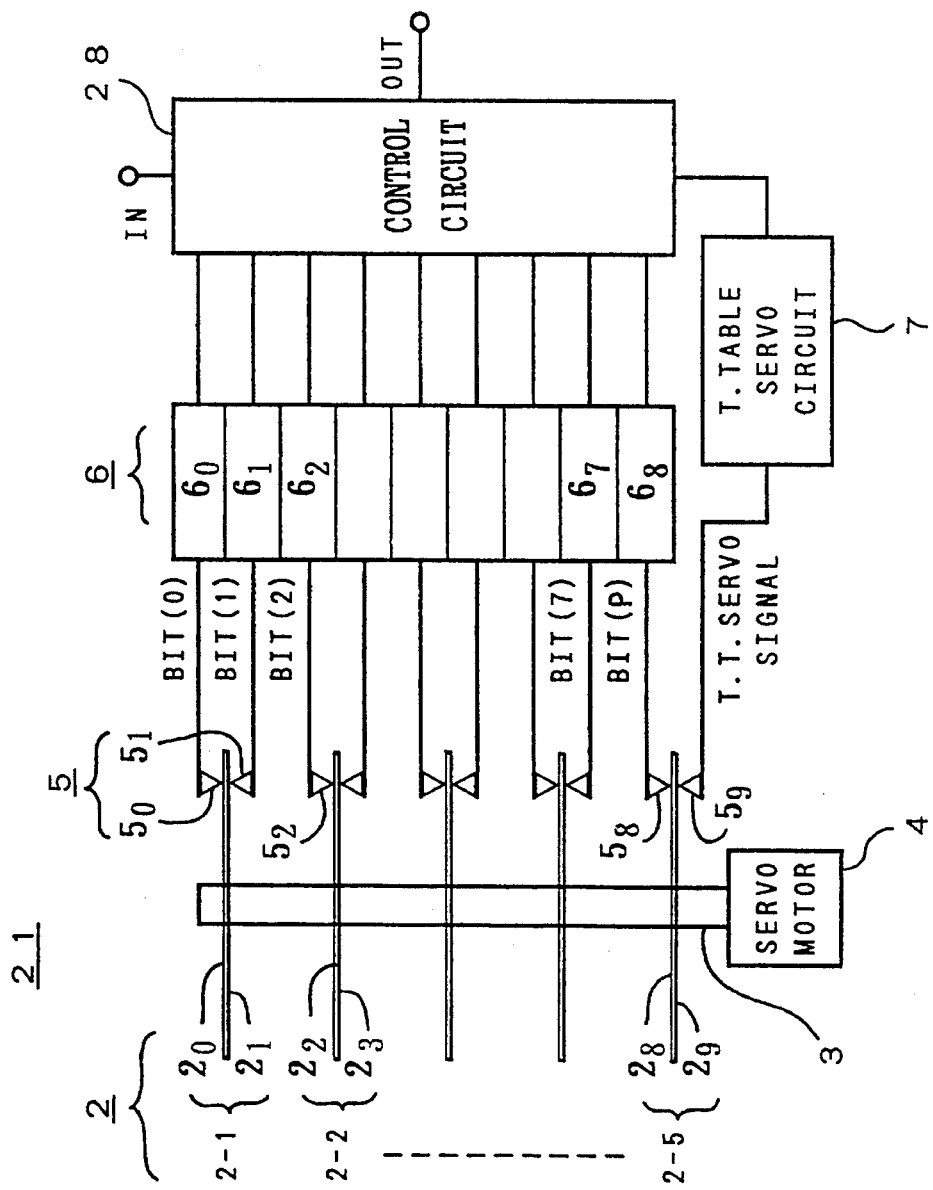
FIG. 3 is a block diagram showing the second example of a conventional magnetic disc recorder.
Figure 4:
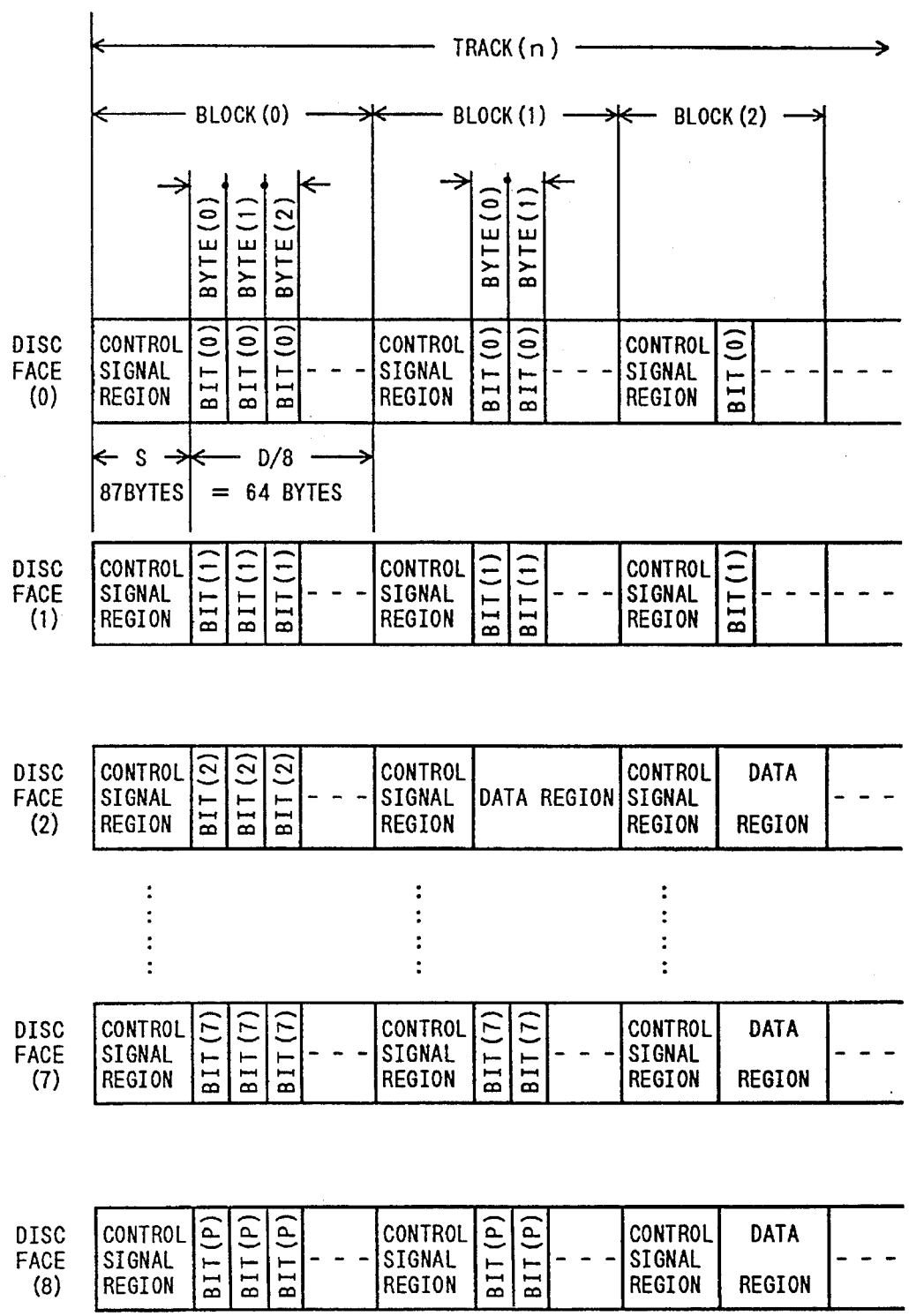
FIG. 4 is an explanatory diagram for explaining the information recording system in the recorder shown in FIG. 3.
Figure 5:
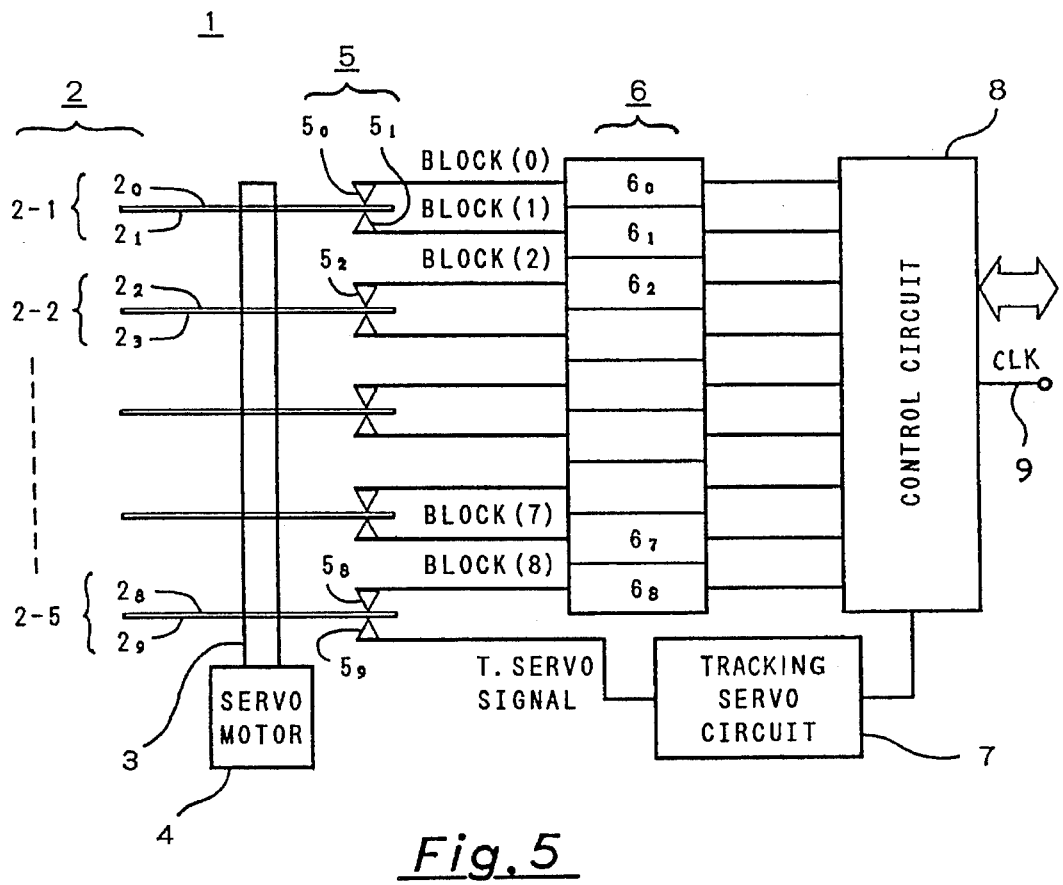
FIG. 5 is a block diagram showing an example of a magnetic disc recorder which is an embodiment of a disc recorder for recording information of the present invention.
Figure 7:
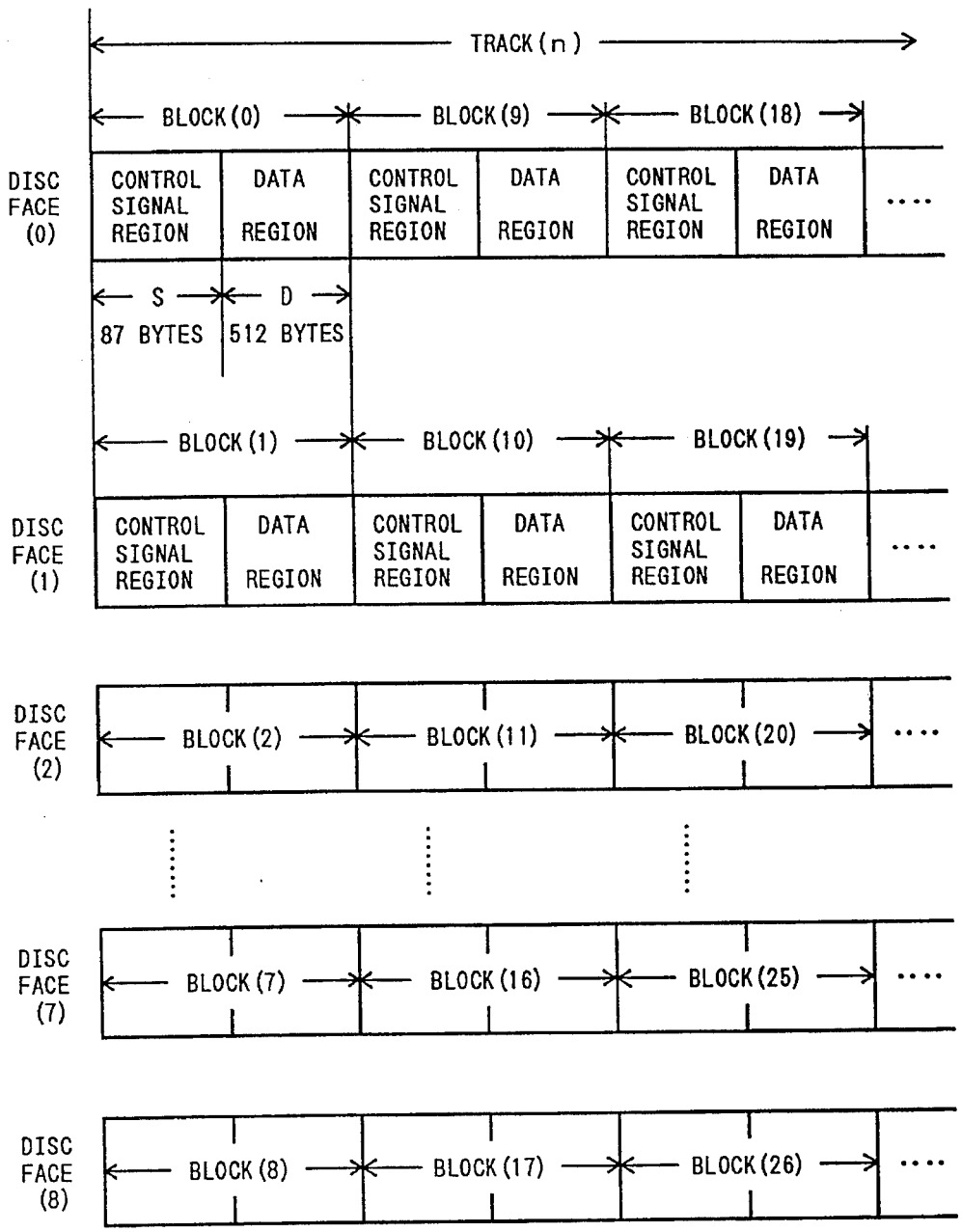
FIG. 7 is an explanatory diagram for explaining an information recording system in the recorder shown in FIG. 5.

FIG. 5 is a block diagram showing an example of a magnetic disc recorder which is an embodiment of a disc recorder for recording information according to the present invention, and FIG. 7 is an explanatory diagram for explaining an information recording system in the recorder shown in FIG. 5. As shown in FIG. 5, a magnetic disc recorder 1 which is an embodiment of the present invention is composed of the previously mentioned magnetic discs 2, the spindle 3, the spindle motor 4, the magnetic heads 5, the recording/reproducing circuit 6, the tracking servo circuit 7, a control circuit 8 to which the recording/reproducing circuit 6 and the tracking servo circuit 7 are connected, respectively, for controlling these circuits in accordance with an instruction inputted through a terminal "IN" from a host system and the like, and description of similar parts to those in the recorders 11 and 21 in the first and the second conventional examples will be omitted.

Figure 6:
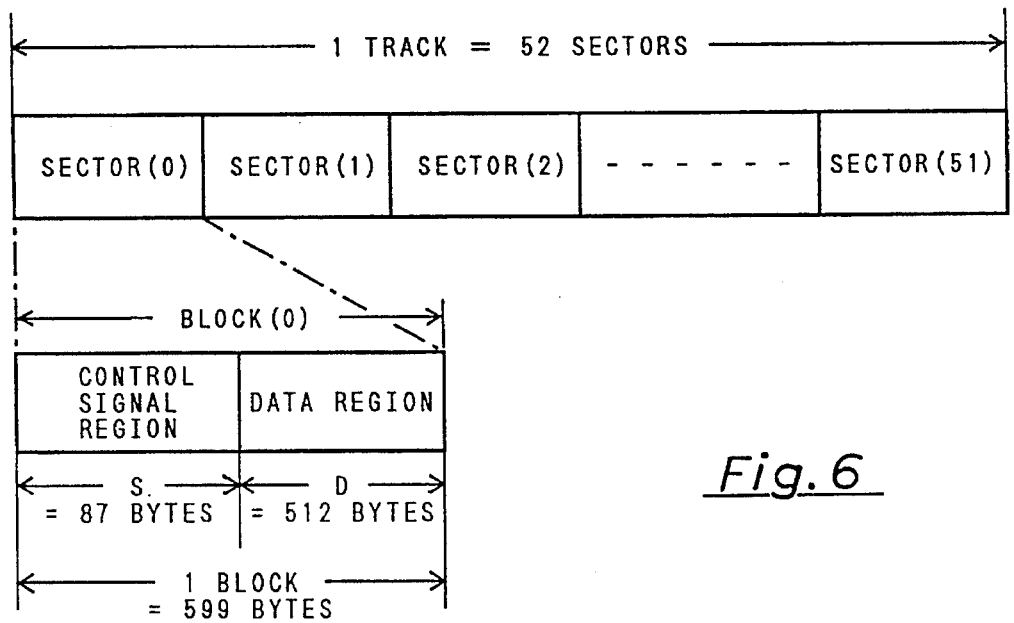
FIG. 6 is an explanatory diagram for explaining a format for recording/reproducing information in the recorders shown in FIG. 1 and FIG. 5.

Further, a signal format for recording and reproducing information in this recorder 1 is identical to what has been described with reference to FIG. 6. Hence, the description thereof will be omitted.

In the information recording system of this magnetic disc recorder 1, as shown in FIG. 7, when the magnetic heads 5 are positioned on the track (n), the heads $5_0$ to $5_8$ concurrently record or reproduce as a parallel operation the blocks (0) to (8) each comprised of the control signal region and the data region containing 599 bytes as explained with reference to FIG. 6, on or from the disc faces (0) to (8) i.e. $2_0$ to $2_8$ respectively. Subsequently, the blocks (9) to (17) are recorded or reproduced by the heads $5_0$ to $5_8$ which operate concurrently, thereafter, every 9 blocks are recorded or reproduced concurrently. Thus, information is recorded/reproduced in parallel operation in the unit of block on the designated tracks on 9 faces of the discs 2.

Although the foregoing explanation is given to an exemplary embodiment in which information is recorded/reproduced in parallel operation in the unit of block on 9 faces of the discs 2, the present invention is not limited thereto, but in the present invention having a plurality of disc faces, recording/reproducing operations may be performed in parallel operation in the unit of block utilizing two or more recording/reproducing channels comprised of recording/reproducing heads arranged correspondingly with the disc faces and recording/reproducing circuits connected to the heads respectively, and if desired, only one of those channels can be selected to use as in the first conventional example.

Further, since a self-clock system is employed on the reproducing operation in the recorder 1 of the embodiment of the present invention, clock signals derived from respective reproduced signals are used for discriminating the reproduced signals picked up by the respective magnetic heads 5, but one clock signal selected from the previously mentioned clock signals, is selected to be used for a deskew circuit provided in the control circuit 8, and outputted from the control circuit 8 through a single output line 9 connected to a host system (not shown), and for recording operation, one clock signal is used in common for all the channels.

Further, in this recorder 1, when the disc faces (0) to (8), i.e. $2_0$ to $2_8$, or the magnetic heads $5_0$ to $5_8$ are defective in the recording operation, corresponding write unsafe signals outputted from the recording/reproducing circuits $6_0$ to $6_8$ are ORed in the control circuit 8, and a result is forwarded to the host system as a single signal. Determination of the defective channel in this case is performed by a software.

Further in the disc recorder 1, one of the 9 recording/reproducing channels is selected to detect an address mark signal at the times of parallel recording/reproducing operations of the 9 channels, and the channel for detecting an address mark signal is switched over to another channel in case of failure of the detection. This channel changeover at the address mark signal detection may be performed in response to the determination and instruction by the host system, or by the control circuit 8. In case of the latter, a circuit arrangement may be made as such that when the channel for detecting address mark signals does not output address mark signals, a timer, responsive to the absence of address mark signals for a predetermined time period, automatically causes such channel changeover.

The magnetic disc recorder 1 in the embodiment of the present invention having the structure as described above performs recording/reproducing operations in parallel in the unit of block. Therefore, the recording/reproducing speed as well as the format efficiency are high compared with the first and second embodiments. Further, it is possible to select arbitrary a single channel or a group of channels to be utilized for the parallel recording/reproducing operation. Hence, a degree of disc face utilization is more flexible compared with the second conventional example. Further, it is easier to provide a countermeasure against a failure of the magnetic heads $5_0$ to $5_8$ because of the above switch over between channels.

Furthermore, since it is easy to convert data into a parallel format, the control of the disc recorder by a host system is facilitated compared with the case of the second conventional example. Moreover, since only one output line is provided from the control circuit 8 to the host system, a cost reduction may be expected.

Since the disc recorder of the present invention for recording information having a structure as described is fast in recording/reproducing speed and also high in the format efficiency, the function as well as a cost performance ratio of the recorder is improved. Further, the disc recorder is improved in the aspects of operability, flexibility in utilization and controllability by a host system.

What is claimed is:

1. Disc recorder for recording information comprising a plurality of information groups, each of the information groups containing 1st to N-th blocks, and each of said 1st to N-th blocks comprising a pair of data region and control signal region which precedes the data region, said disc recorder comprising:

1st to N-th disc faces, each of which comprises a string of sectors to be recorded with said information;

1st to N-th head means for recording said 1st to N-th blocks in each of the information groups respectively on said 1st-Nth disc faces;

1st to N-th recording circuit means provided respectively to said 1st to N-th head means for driving thereof with said 1st to N-th blocks; and controlling means for causing said 1st to N-th recording circuit means and said 1st to N-th head means to perform a recording operation such that said 1st to N-th blocks are recorded respectively and concurrently on said 1st to N-th disc faces, wherein each block comprising said pair of said string of sectors, and wherein said recording operation is sequentially performed on said plurality of information groups.

* * * * *